US011888280B2

(12) United States Patent
Davidsz et al.

(10) Patent No.: US 11,888,280 B2
(45) Date of Patent: Jan. 30, 2024

(54) SYSTEMS AND METHODS FOR FLAT CABLE INSTALLATION

(71) Applicant: ROCKWELL AUTOMATION TECHNOLOGIES, INC., Mayfield Heights, OH (US)

(72) Inventors: Mark E. Davidsz, Oak Creek, WI (US); Michael S. Baran, Milwaukee, WI (US); Shravan Rajmohan, Bengaluru (IN); Douglas J. Carpiaux, Milwaukee, WI (US); Scott H. Micoley, Plymouth, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 17/887,120

(22) Filed: Aug. 12, 2022

(65) Prior Publication Data

US 2022/0393417 A1 Dec. 8, 2022

Related U.S. Application Data

(62) Division of application No. 17/176,075, filed on Feb. 15, 2021, now Pat. No. 11,545,801.

(51) Int. Cl.

| | |
|---|---|
| ***H01R 43/042*** | (2006.01) |
| ***H01R 43/048*** | (2006.01) |
| ***H01R 12/69*** | (2011.01) |

(52) U.S. Cl.

CPC ......... *H01R 43/042* (2013.01); *H01R 43/048* (2013.01); *H01R 12/69* (2013.01)

(58) Field of Classification Search

CPC ...... H01R 4/2433; H01R 9/031; H01R 12/59; H01R 12/61; H01R 12/613; H01R 12/616;

(Continued)

(56) References Cited

U.S. PATENT DOCUMENTS

| | | | |
|---|---|---|---|
| 4,020,540 | A | 5/1977 | Casciotti et al. |
| 4,209,219 | A | 6/1980 | Proietto |

(Continued)

FOREIGN PATENT DOCUMENTS

| | | | |
|---|---|---|---|
| CN | 103140707 | A | 6/2013 |
| EP | 0602539 | A2 | 6/1994 |

(Continued)

OTHER PUBLICATIONS

European Patent Office, Extended Search Report, Application No. 22152227.9, dated Jun. 27, 2022, 9 pages.

(Continued)

*Primary Examiner* — Peter Dungba Vo
*Assistant Examiner* — Joshua D Anderson
(74) *Attorney, Agent, or Firm* — Quarles & Brady LLP

(57) ABSTRACT

A device is provided for aligning a ribbon cable relative to an electrical connector to crimp the electrical connector onto the ribbon cable with a tool. The device includes a side portion and a central piece. The side portion includes an upper end and a cable track having a width sized to receive the ribbon cable. The central piece is coupled to the side portion and includes an upper surface. The upper surface of the central piece and the upper end of the side portion at least partially define a connector retaining segment sized to receive the electrical connector.

20 Claims, 13 Drawing Sheets

(58) Field of Classification Search
CPC ........ H01R 12/67; H01R 12/68; H01R 12/69; H01R 13/506; H01R 43/005; H01R 43/01; H01R 43/015; H01R 43/027; H01R 43/04; H01R 43/042; H01R 43/0421; H01R 43/048; H01R 43/0488; Y10T 29/49174; Y10T 29/49181; Y10T 29/49185; Y10T 29/49188; Y10T 29/4919; Y10T 29/53213; Y10T 29/53217; Y10T 29/53222; Y10T 29/53226; Y10T 29/5323; Y10T 29/53239
See application file for complete search history.

(56) References Cited

U.S. PATENT DOCUMENTS

| | | | | | |
|---|---|---|---|---|---|
| 4,228,709 | A | * | 10/1980 | Guzay, Jr. | H02G 1/005 29/564.6 |
| 4,252,396 | A | | 2/1981 | Wilson | |
| 4,255,009 | A | | 3/1981 | Clark | |
| 4,460,228 | A | | 7/1984 | Lane et al. | |
| 4,538,873 | A | | 9/1985 | Worth | |
| 4,655,528 | A | | 4/1987 | Groft | |
| 4,668,039 | A | | 5/1987 | Marzili | |
| 4,824,384 | A | | 4/1989 | Nicholas et al. | |
| 4,891,019 | A | | 1/1990 | Olsson | |
| 4,911,210 | A | | 3/1990 | Hillegonds | |
| 4,940,430 | A | | 7/1990 | Fujitani et al. | |
| 5,059,137 | A | | 10/1991 | Dale et al. | |
| 5,456,617 | A | | 10/1995 | Chishima et al. | |
| 5,465,479 | A | | 11/1995 | Bowen et al. | |
| 5,934,930 | A | | 8/1999 | Camps et al. | |
| 6,108,904 | A | * | 8/2000 | Brekosky | H01R 12/772 29/749 |
| 6,232,557 | B1 | | 5/2001 | Lounsbury et al. | |
| 7,007,346 | B2 | | 3/2006 | Hoffman | |
| 7,156,686 | B1 | | 1/2007 | Sekela et al. | |
| 7,354,310 | B1 | | 4/2008 | Brown | |
| 8,723,044 | B2 | | 5/2014 | Onodi | |
| 9,698,498 | B1 | | 7/2017 | Wang et al. | |
| 9,728,864 | B2 | | 8/2017 | Mathews et al. | |
| 9,954,296 | B2 | | 4/2018 | Haensgen et al. | |
| 11,189,954 | B2 | | 11/2021 | Kwon et al. | |
| 11,251,550 | B1 | | 2/2022 | Davidsz et al. | |
| 2002/0016104 | A1 | | 2/2002 | Maegawa | |
| 2004/0235335 | A1 | | 11/2004 | Schoeffel et al. | |
| 2006/0183360 | A1 | | 8/2006 | Nave et al. | |
| 2008/0076295 | A1 | | 3/2008 | Lappoehn | |
| 2018/0013220 | A1 | | 1/2018 | Haensgen et al. | |

FOREIGN PATENT DOCUMENTS

| | | | |
|---|---|---|---|
| EP | 2600470 | A1 | 6/2013 |
| EP | 1983616 | B1 | 10/2015 |
| JP | S5798695 | U | 6/1982 |
| JP | H0474889 | U | 6/1992 |
| JP | 2938780 | B2 | 8/1999 |

OTHER PUBLICATIONS

European Patent Office, Extended Search Report, Application No. 22152017.4, dated Jul. 8, 2022, 13 pages.

* cited by examiner

SYSTEMS AND METHODS FOR FLAT CABLE INSTALLATION

CROSS-REFERENCES TO RELATED APPLICATIONS

This application is a divisional of U.S. patent application Ser. No. 17/176,075, filed Feb. 15, 2021, and entitled "Systems and Methods for Flat Cable Installation," the entire contents of which is incorporated herein by reference.

STATEMENT REGARDING FEDERALLY SPONSORED RESEARCH

Not Applicable

BACKGROUND INFORMATION

The subject matter disclosed within relates generally to flat cable installation devices for electrical connectors. In particular, the subject matter relates to installation devices for installing ribbon cables on connectors such as, but not limited to, those used in conjunction with network transmission media of the type used in industrial control, monitoring, and similar power and data network systems.

BRIEF DESCRIPTION

In one embodiment, a device is provided for aligning a ribbon cable relative to an electrical connector to crimp the electrical connector onto the ribbon cable with a tool. The device includes a side portion and a central piece. The side portion includes an upper end and a cable track having a width sized to receive the ribbon cable. The central piece is coupled to the side portion and includes an upper surface. The upper surface of the central piece and the upper end of the side portion at least partially define a connector retaining segment sized to receive the electrical connector.

In one embodiment, a method of installing a ribbon cable on a connector is provided. The method includes placing the connector within a connector retaining segment of a jig and positioning the ribbon cable within a cable track of the jig. The method also includes aligning the ribbon cable across an open top of the connector, formed between a cover and a housing of the connector. The method further includes applying compressive forces against an upper surface and a lower surface of the connector to urge the cover toward the housing to entrap the ribbon cable within the housing.

The foregoing and other aspects and advantages of the present disclosure will appear from the following description. In the description, reference is made to the accompanying drawings which form a part hereof, and in which there is shown by way of illustrations one or more embodiments of the present disclosure. Such embodiments do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

DETAILED DESCRIPTION

Figure 1:
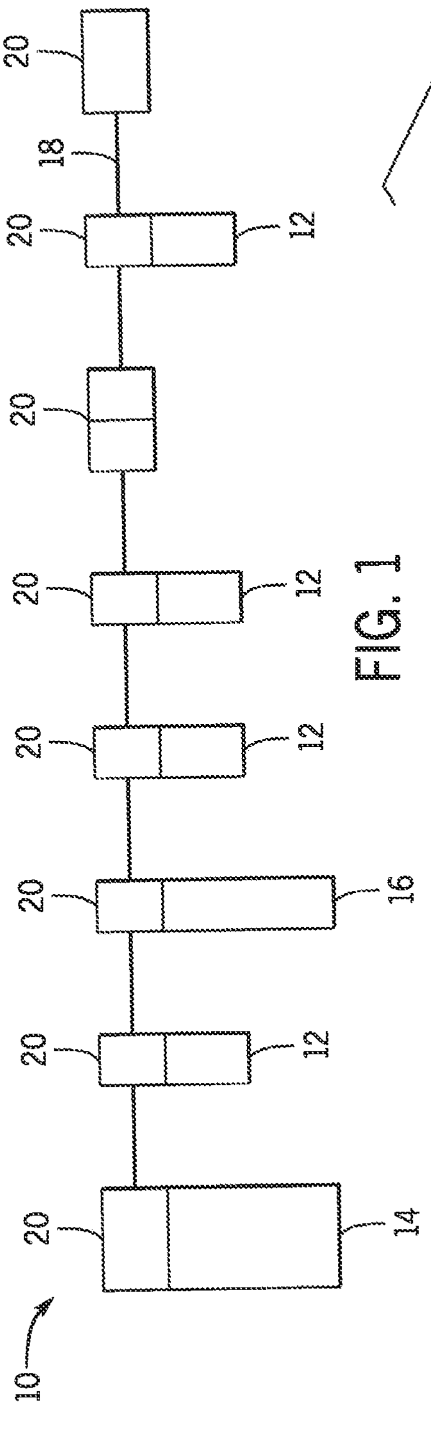
FIG. 1 is a schematic view of a data and power network.

Before any embodiments of the invention are explained in detail, it is to be understood that the embodiments are not limited in its application to the details of construction and the arrangement of components set forth in the following description or illustrated in the following drawings. Aspects of the present disclosure are capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the present disclosure. Various modifications to the illustrated embodiments will be readily apparent to those skilled in the art, and the generic principles herein can be applied to other embodiments and applications without departing from embodiments of the present disclosure. Thus, embodiments of the present disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the present disclosure. Skilled artisans will recognize the examples provided herein have many useful alternatives and fall within the scope of embodiments of the present disclosure.

Disclosed herein are devices and methods for positioning and installing a flat, ribbon-style cable on an electrical connector. The connector may be used in conjunction with such a ribbon cable for use in industrial control, monitoring, and similar power and data network systems. The device may comprise a one-piece, reusable jig configured to align and retain a ribbon cable relative to a connector during installation.

By way of example, FIG. 1 schematically illustrates a data and power network 10. The network 10 includes one or more device nodes 12, intelligent power taps 14, and/or non-intelligent power taps 16 coupled to one another via a network ribbon cable 18. Each device node 12, intelligent power tap 14, and/or non-intelligent power tap 16 can receive and/or transmit power and/or data signals from the ribbon cable 18 via a respective connector 20. More specifically, the connector 20 can include internal terminals that can be aligned with and electrically contact conductors of the ribbon cable 18 when the connector 20 clamps onto the ribbon cable 18 (that is, when the ribbon cable 18 is installed on the connector 20). With the ribbon cable 18 installed, a respective connector 20 can be coupled to a device node 12, intelligent power tap 14, or non-intelligent power tap 16 to transmit and/or receive control signals, data, and/or power via the ribbon cable 18 in accordance with various standard protocols. Furthermore, within the network 10, at one or both ends of ribbon cable 18, a connector 20 can be provided in the form of a terminator for capping ribbon cable ends and terminating the signal conductors of the ribbon cable 18. Also, one or more connectors 20 can be provided in the form of splicers to electrically connect and cap respective ends of two ribbon cables 18.

Figure 1A:
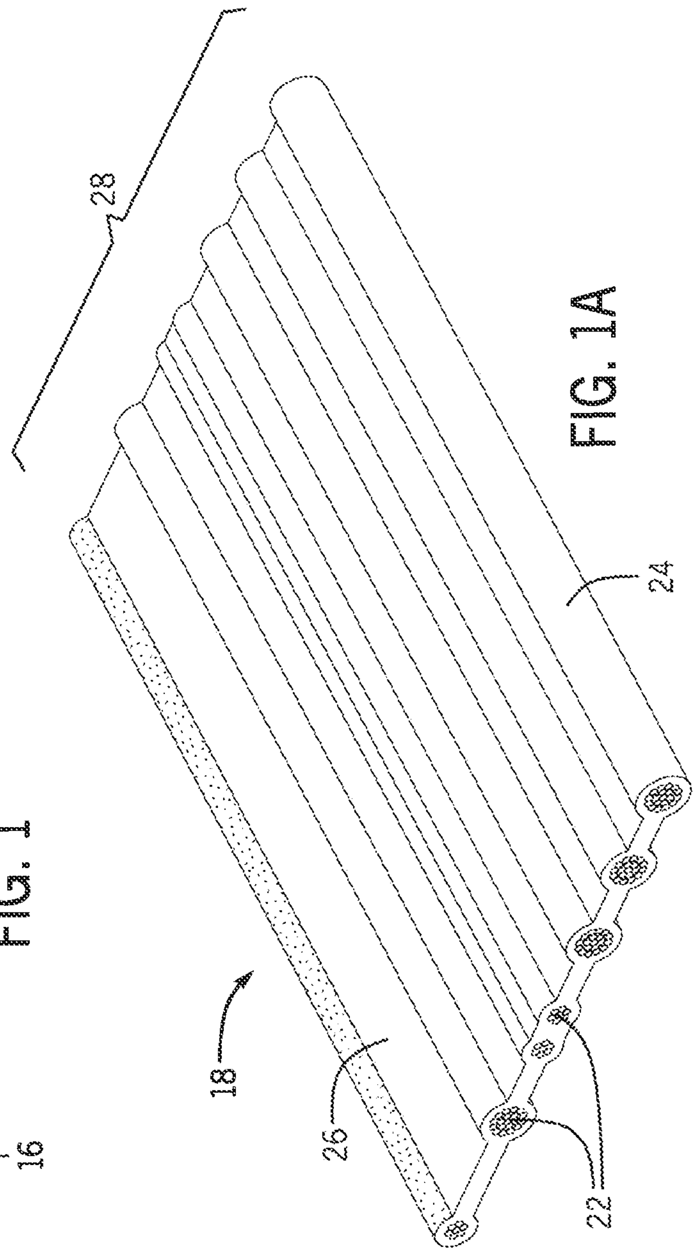
FIG. 1A is a perspective view of a multi-conductor ribbon cable.
Figure 4:
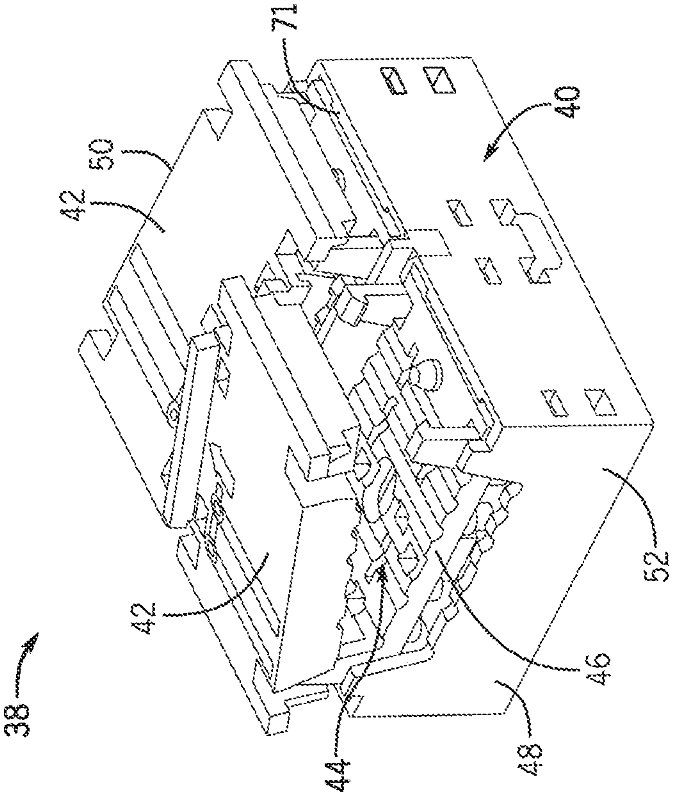
FIG. 4 is a perspective view of a splicer in a preassembled state.

As shown in FIG. 1A, a ribbon cable 18 for use in such a network 10 can include a plurality of parallel conductors 22 enclosed in a common insulation jacket 24. The conductors 22 can comprise a conductive material such as, but not limited to, copper or another conductive metal. The insulation jacket 24 can comprise an electrical insulating material such as, but not limited to, a plastic material. The insulation jacket 24 can sit on the conductors 22, e.g., as an extruded integral insulation, so that a cylindrical outer contour on the top and bottom of the ribbon cable 18 emerges, separated by flat insulation webbing 26 between conductors 22. In this manner, the ribbon cable 18 can define a ribbon profile 28 of curved, longitudinal tracks on top and bottom surfaces thereof In some embodiments, all connectors 20 within the network 10 can include generally similar components configured to be coupled to and guide the ribbon cable 18. By way of example, as shown in FIGS. 2-4, connectors 20 of some embodiments can include, but are not limited to: a power tap left connector 30, configured to couple a ribbon cable 18 to a power tap 14, 16 to direct power in a first direction; a node connector 32, configured to couple a ribbon cable 18 to a device node 12; a power tap right connector 34 configured to couple a ribbon cable 18 to a power tap 14, 16 to direct power in a second direction; a terminator 36 configured to terminate a ribbon cable 18; and a splicer 38 configured to splice together two ribbon cables 18.

Generally, each connector 30-38 can include at least a housing 40 and a cover 42 configured to clamp onto the housing 40 to enclose a ribbon cable 18 therewithin. For example, FIGS. 3 and 4 illustrate the connectors 36, 38 in a preassembled state to permit cable installation. More specifically, when in the preassembled state, the cover 42 can be pulled away from the housing 40 so that a ribbon cable 18 can be positioned within (e.g., extend across) an open top 44 of the housing 40 and be supported by a cable organizer 46 within the housing 40. When a ribbon cable 18 is positioned across the open top 44, the cover 42 can be clamped down onto the housing 40, moving the connector 30-38 into an assembled state, as shown in FIG. 2, and forcing the ribbon cable 18 and the cable organizer 46 downward into an interior of the housing 40. When enclosed within the housing 40 in the assembled state, individual conductors 22 of the ribbon cable 18 can engage one or more conductor contacts (not shown) within the housing 40, such as insulation-displacement contacts (IDCs) and/or insulation-piercing contacts (IPCs), discrete or mounted on an internal printed circuit board assembly (not shown). For example, the conductor contacts can be held in staggered positions to allow the adjacent conductors 22 of the ribbon cable 18 to be moved into a certain position within the housing 40.

Figure 2:
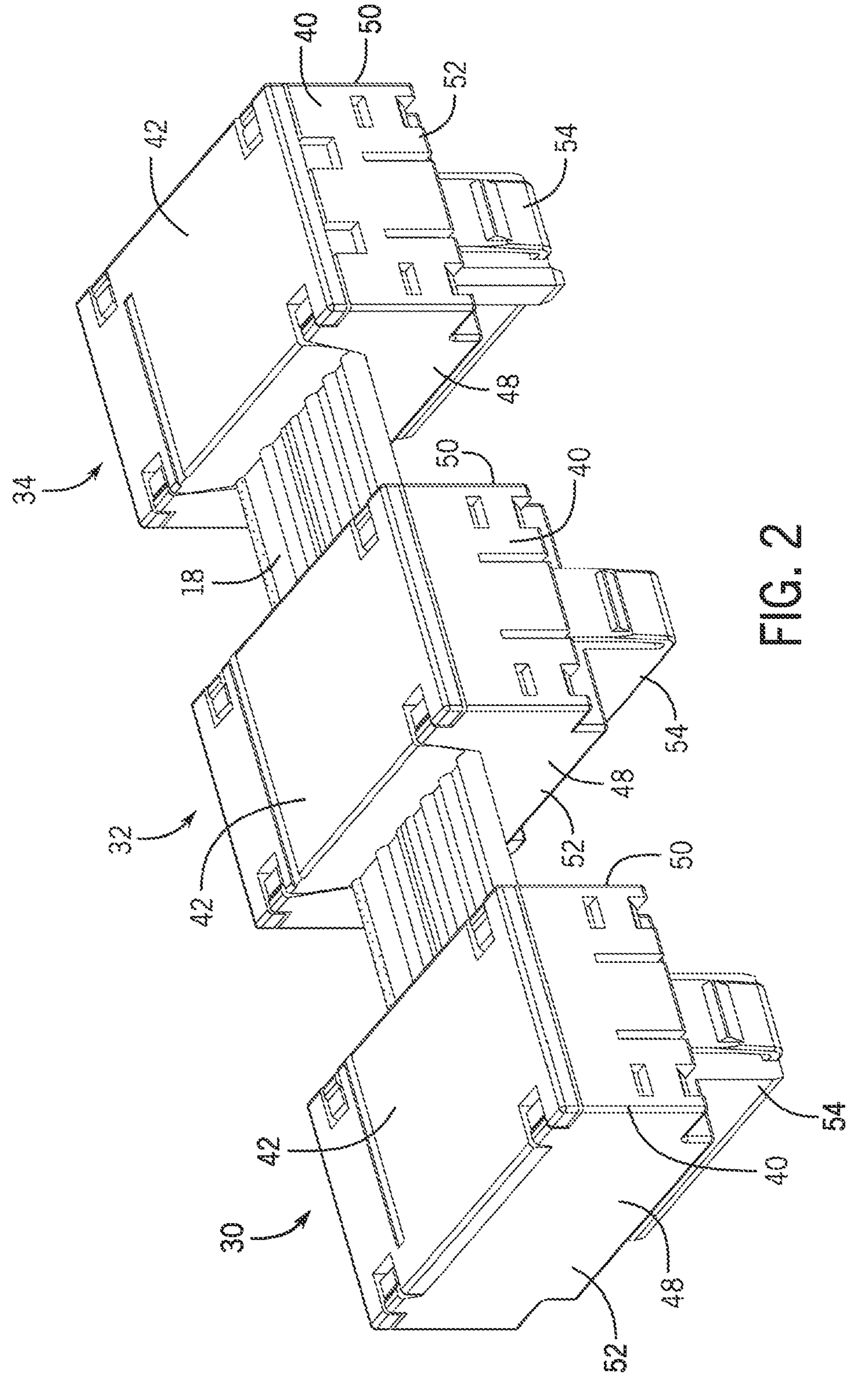
FIG. 2 is a perspective view of a power tap left connector, a node connector, and a power tap right connector, each in an assembled state installed on a ribbon cable.
Figure 3:
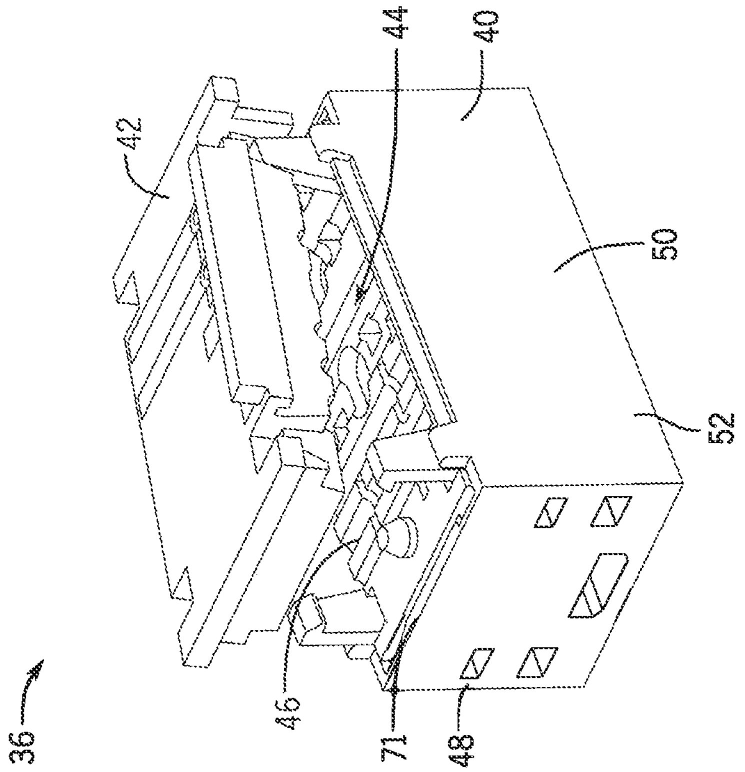
FIG. 3 is a perspective view of a terminator in a preassembled state.

As shown in FIG. 2, when the ribbon cable 18 is installed on a power tap left connector 30, a cut end of a ribbon cable 18 can be adjacent the first, or left, side 48 thereof, and the ribbon cable 18 extends out of the connector 30 from the second, or right, side 50 thereof. When a ribbon cable 18 is installed on a node connector 32, the ribbon cable 18 extends out of the connector 30 from both sides 48, 50. In the power tap right connector 34, a cut end of a ribbon cable 18 is adjacent the second, or right, side 50 thereof, and the ribbon cable 18 extends out of the connector 34 from the first, or left, side 48 thereof. Like the power tap connectors 30, 34, the terminator 36 can include one side (e.g., a first side 48 or a second side 50) accommodating a cut end of a ribbon cable 18. Like the power tap connectors 30, 34 and the terminator 36, the splicer 38 can accommodate cut ends of two ribbon cables 18, such that a respective ribbon cable 18 extends out of the connector 38 from each side 48, 50. As shown in FIGS. 2-4, the connectors 30-38 may be generally similar in shape and/or size with similar housings 40 and covers 42, though the splicer 38 may be larger than the other connectors 30-36 in order to accommodate two ribbon cables 18. For example, in some embodiments, the splicer 38 can generally be sized as two side-by-side terminators 36. Further features and components of the connectors 30-38 herein are described and further illustrated in U.S. patent application Ser. No. 17/114,203, filed Dec. 7, 2020, the entire contents of which is incorporated herein by reference.

As all connectors 30-38 described above can include similar parts, such as similar housings 40 and/or covers 42, a ribbon cable 18 can be installed on any connector 30-38 using substantially the same method and/or the same tooling. For example, in some embodiments, a ribbon cable 18 can be installed on a desired connector 30-38 using traditional tooling, such as conventional pliers. However, in other embodiments, specialty tooling specific to the connector 30-38 may be used.

Thus, according to some embodiments, the following method can be executed to install a ribbon cable 18 on a connector 30-38. First, with the connector 30-38 in the preassembled state, the cover 42 can be moved away from the housing 40 to create a cable access pathway. The ribbon cable 18 can then be inserted through the cable access pathway and positioned onto the cable organizer 46. In some embodiments, the cover 42 can remain coupled to the housing 40 in the preassembled state and, as a result, the connector 30-38 can "hang" on the ribbon cable 18 (e.g., with the cover 42 above the ribbon cable 18 and the housing 40 below the ribbon cable 18) during installation at a desired location along the ribbon cable 18 before clamping.

Once the ribbon cable 18 is generally aligned, the cover 42 can be pressed toward the housing 40 to entrap the ribbon cable 18 within the housing 40 between the cover 42 and the cable organizer 46. In some embodiments, a clamping tool, such as a pliers, can be used to press the cover 42 toward the housing 40 to move the connector 30-38 from the preassembled state to the assembled state. That is, the tool (e.g., the jaws of the pliers) can engage upper and lower surfaces of the connector 30-38 in order to press the cover 42 toward the housing 40. The upper surface can be, for example, an upper surface of the cover 42 and the lower surface can be, for example, a lower surface of the housing 40 or a protection cap (not shown) that is installed over the lower surface of the housing 40. By pressing or clamping the cover 42 onto the housing 40 to move the connector 30-38 into the assembled state, the connector 30-38 is crimped onto the ribbon cable 18 and the ribbon cable 18 can be pressed downward into the housing 40 so that individual conductors 22 of the ribbon cable 18 engage the internal conductor contacts for electrical termination.

According to some embodiments, a device may be provided to assist in positioning, registering, and/or temporary fixing a ribbon cable 18 and connector 30-38 together, subsequently allowing the connector 30-38 to be crimped onto the ribbon cable 18 for electrical termination. Generally, in some embodiments, the device can be low-cost, reusable installation jig including features that position, attach to, and/or retain a ribbon cable 18, until a connector 30-38 can be moved into position along the ribbon cable 18. Subsequently or alternately, the jig can be designed so that it can position, attach to, and remain on a ribbon cable 18, at any segment along its length, and slide between ribbon cable ends to a new desired termination point to permit multiple connector installations. That is, these constructions and methods can serve to repeatedly position, align, and prepare a connector 30-38 and flat, ribbon-style cable 18 together for electrical termination by an installer. By doing so, these constructions and methods can help ensure and/or improve proper registration during electrical termination. For example, these constructions and methods can help ensure that the proper conductor contacts of the connector 30-38 contact only the respective proper conductors 22 of the ribbon cable 18, potentially minimizing a risk of electrical shorts during termination.

FIGS. 5-19 below illustrate various examples of jigs according to some embodiments. Generally, each jig can include at least one cable guide segment configured to receive and/or guide a ribbon cable 18 and a connector retaining segment configured to receive a connector 30-38. Throughout the description below, example connectors 30-38 may be described with reference to the jigs of FIGS. 5-19, though it should be noted that, unless explicitly discussed, features and assembly concepts of the jigs may equally apply to all connectors 30-38. Furthermore, the embodiments described below with respect to FIGS. 5-19 may include similar features that will be referred to with similar reference numerals and, as such, descriptions of certain features with respect to one embodiment may be equally applied to those features illustrated in another embodiment, even if not explicitly described.

For example, FIGS. 5-8 illustrate a jig 60 according to some embodiments. The jig 60 can be a one-piece component that is generally "H-shaped" with two elongated sides 62 separated by a central piece 64. The jig 60 can include a cable track 66 (e.g., a cable guide segment) along both sides 62 and a connector retaining segment 68 formed by an upper surface of the central piece 64 and upper ends 70 of the sides 62.

Figure 5:
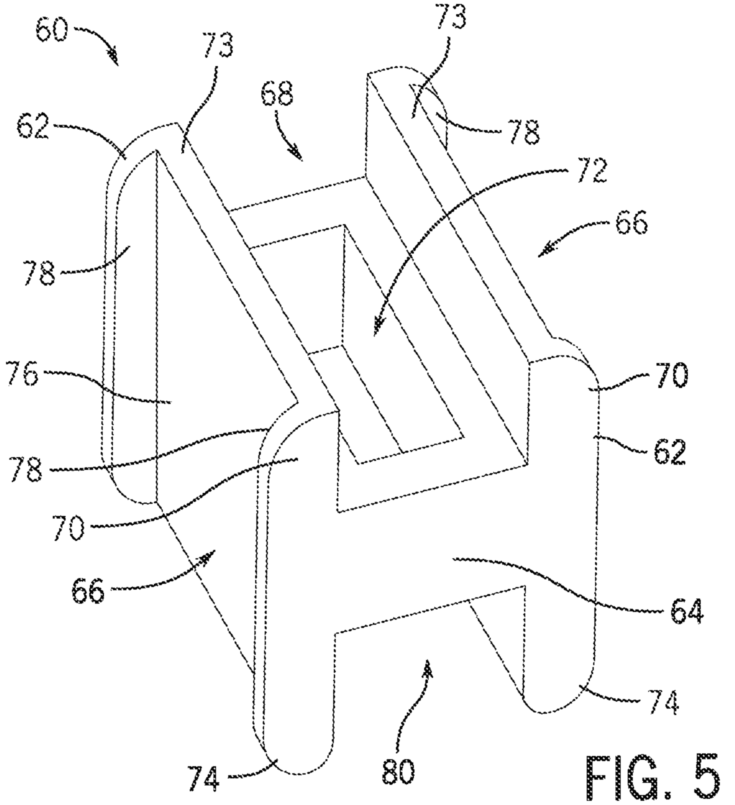
FIG. 5 is a perspective view of a jig according to some embodiments.
Figure 6:
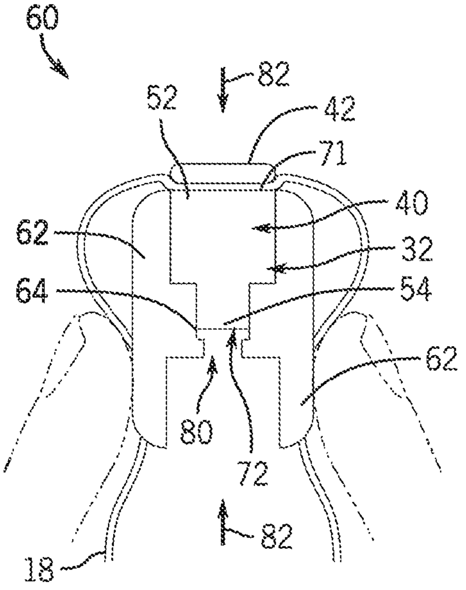
FIG. 6 is a side view of the jig of FIG. 5 with a node connector.
Figure 7:
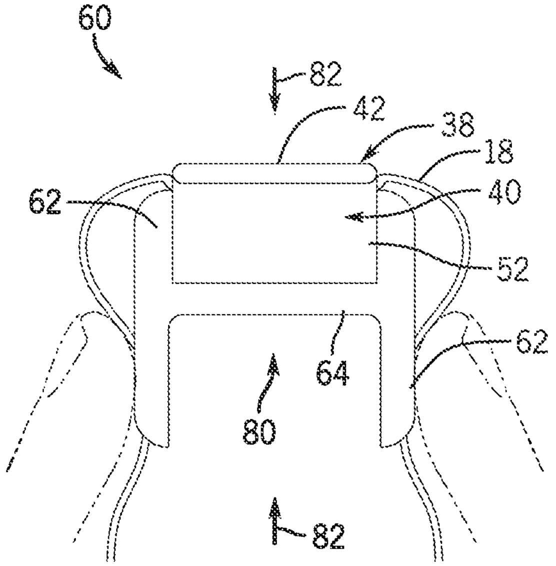
FIG. 7 is a side view of another embodiment of the jig of FIG. 5 with a splicer.

FIGS. 5 and 6 illustrate the jig 60 as a first size to accommodate, for example, a node connector 32, a power tap connector 30, 34, and/or a terminator 36. Referring back to FIGS. 2-4, the housings 40 of the node connector 32 and the power tap connectors 30, 34 can each include an upper section 52 and a lower section 54, while the housing of the terminator 36 and the splicer 38 may include only an upper section 52. Accordingly, in some embodiments, the central piece 64 can include a length approximately equal to a length of the upper section 52 of the housings 40 of the connectors 30-36. Additionally, FIG. 7 illustrates the jig 60 as a second, larger size (e.g., with a longer central piece 64) to accommodate, for example, a splicer 38. Thus, the central piece 64 shown in FIG. 7 can include a length approximately equal to a length of the upper section 52 of the housing 40 of the splicer 38.

Furthermore, in some embodiments, as shown in FIGS. 5 and 6, the central piece 64 can include a receiving well 72 sized to receive the lower section 54 of the housings 40 of the connectors 30-34. As a result, when a node connector 32 or a power tap connector 30, 34 is installed in the connector retaining segment 68, the upper section 52 rests upon the an upper surface of the central piece 64 between the upper ends 70 and the sides 62 and the lower section 54 sits within the receiving well 72 so that an upper edge 71 of the housing 40 can generally lie flush with upper edges 73 of the cable tracks 66 and/or the sides 62, as shown in FIG. 6. When a terminator 36 is installed in the connector retaining segment 68, the upper section 52 rests upon the upper surface of the central piece 64 between the upper ends 70 of the sides 62. Accordingly, the receiving well 72 can be sized to accommodate all sizes of lower sections 54 for universal use (e.g., in applications where the lower section 54 of the node connector 32 may be smaller than the lower section 54 of the power tap connectors 30, 34). In some embodiments, the receiving well 72 can alternatively be the size of a single lower section 54 for use with a single connector 30-34, or the size of a removable protection cap (not shown) configured to cover the lower section 54 of the housings 40 in some applications. Additionally, with reference to FIG. 7, when a splicer 38 is installed in the connector retaining segment 68, the upper section 52 rests upon the upper surface of the central piece 64 between the upper ends 70 of the sides 62.

As noted above, the sides 62 and, more specifically, outer surfaces of the sides 62 can define the cable tracks 66. For example, each cable track 66 can include a flat section 76 sized to receive a face of the ribbon cable 18 and opposing retaining walls 78 extending upward from the flat section 76 and configured to engage edges of the ribbon cable 18. Thus, a width of the flat section 76 (e.g., the width from retaining wall 78 to retaining wall 78) can be substantially equal to a width of a ribbon cable 18. In some embodiments, the cable tracks 66 can extend an entire length of the sides 62, as shown in FIG. 5. However, in other embodiments, the cable tracks 66 may extend a shorter length than that of the sides 62. Additionally, in some embodiments, the flat section 76 may include a flat surface (as shown in FIG. 5), or may include grooves (as further described below) that form an inverse ribbon cable profile sized to mirror the ribbon cable profile 28 of a ribbon cable 18 so that the ribbon cable 18 can sit within the inverse ribbon cable profile, thus further helping align a ribbon cable 18 within the cable track 66.

Accordingly, as shown in FIG. 6, a pre-assembled connector 32 can be placed within the connector retaining segment 68. In some embodiments, the jig 60 can be substantially flexible so that pressing together lower ends 74 of the sides 62 causes the upper ends 70 to expand away from each other, permitting insertion of the connector 32. And releasing the lower ends 74 can thus cause the upper ends 70 to bias back inward, clamping against sides 48, 50 of the connector 32. Additionally, a ribbon cable 18 can be positioned to fit within or be aligned with the cable tracks 66 on one or both sides 62, and extend across the top of the jig 60. In some embodiments, the ribbon cable 18 can be aligned before the connector 32, or vice versa, so that, when both components are positioned, the ribbon cable 18 extends across an open top of the preassembled connector 32.

To assemble the connector 32, a user can pinch the ribbon cable 18 against one or both tracks 66 to hold the cable 18 in place and ensure proper alignment of the cable 18 with the connector 32, and also to set a specific crimping location of the connector 32 along the ribbon cable 18. As shown in FIG. 6, the ribbon cable 18 may be aligned only in a portion of the cable tracks 66 during installation. Then, the user can engage the upper and lower surfaces of the connector 32 or, in some embodiments, a lower surface of the central piece 64 with a clamping tool (such as tool 65 shown in FIG. 15). For example, a space 80 defined between the lower ends 74 of the sides 62 and the lower surface of the central piece 64 can serve as a guide for proper tool alignment with the connector 32. That is, a user can insert lower jaws of the tool in the space 80 to engage the central piece 64. The tool can be engaged then press the cover 42 and the housing 40 together, as indicated by force arrows 82, to cause the connector 32 to crimp onto the ribbon cable 18. Accordingly, FIG. 7 illustrates an assembled connector 38 after crimping. In some embodiments, by causing the tool to engage the central piece 64, for example, rather than a lower surface of the housing 40, the jig 60 can help protect the lower surface of the housing 40 (which may be open with exposed electrical contacts)

Figure 8:
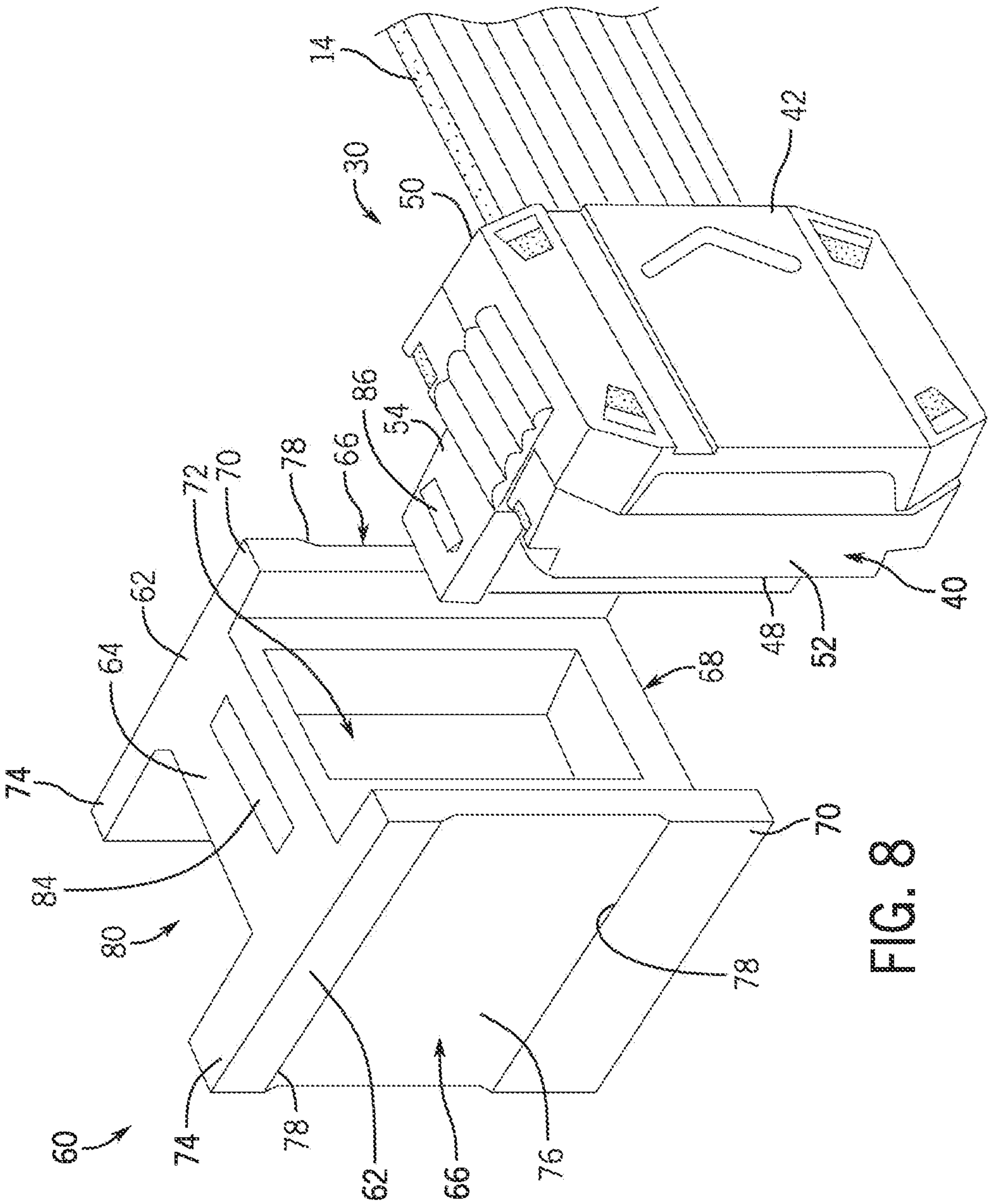
FIG. 8 is a perspective view of another embodiment of the jig of FIG. 5 with a power tap left connector.

In some embodiments, as shown in FIG. 8, the jig 60 can also include one or more connector retention features. More specifically, in some embodiments, the central piece 64 (or another portion of the jig 60) can include a detent 84 sized to receive a protrusion 86 on the connector housing 40 via a snap-fit engagement. As a result, the connector 30 can be snapped into the jig 60 (e.g., the connector 32 can be pressed toward the central piece 64 until the protrusion 86 snaps into the detent 84) to better retain the connector 32 in place during termination. While FIG. 8 illustrates the jig 60 including a single detent 84 configured to engage a single protrusion 86 of the connector 32, in some embodiments, the jig 60 may include a plurality of detents 84 configured to engage various protrusions 86 of a connector 32.

Figure 9:
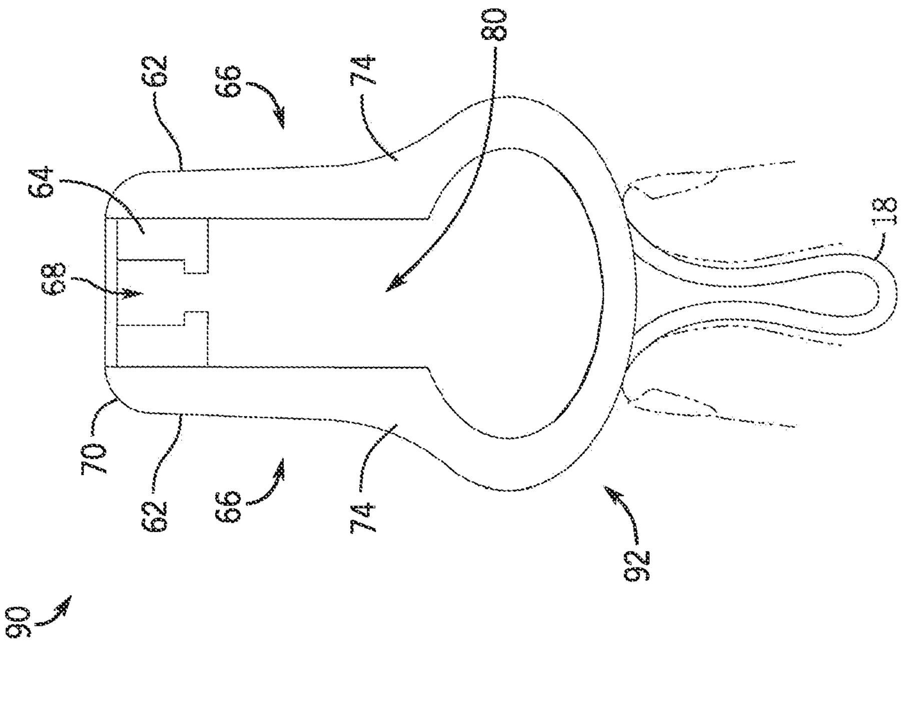
FIG. 9 is a side view of a jig according to some embodiments.

FIG. 9 illustrates a jig 90 according to some embodiments, with similar features and similar installation methods as the jigs 60 of FIGS. 5-8. For example, the jig 90 can include two elongated sides 62 separated by a central piece 64. The jig 90 can include a cable track 66 (e.g., cable guide segment) along one or both sides 62 and a connector retaining segment 68, formed by the central piece 64 and upper ends 70 of the sides 62, and including a receiving well 72. As shown in FIG. 9, lower ends 74 of each side 62 can bulge outward, then curve back inward and connect to form a curved or sculpted lower profile 92. A user can pinch cable ends together taut against the profile 92 (e.g., below the jig 90, as shown in FIG. 9) to help retain the ribbon cable 18 within the cable tracks 66 during installation. Additionally, the lower ends 74 of the sides can still define an open space 80 below the central piece 64 to accommodate a clamping tool for installation, as described above.

Figure 10:
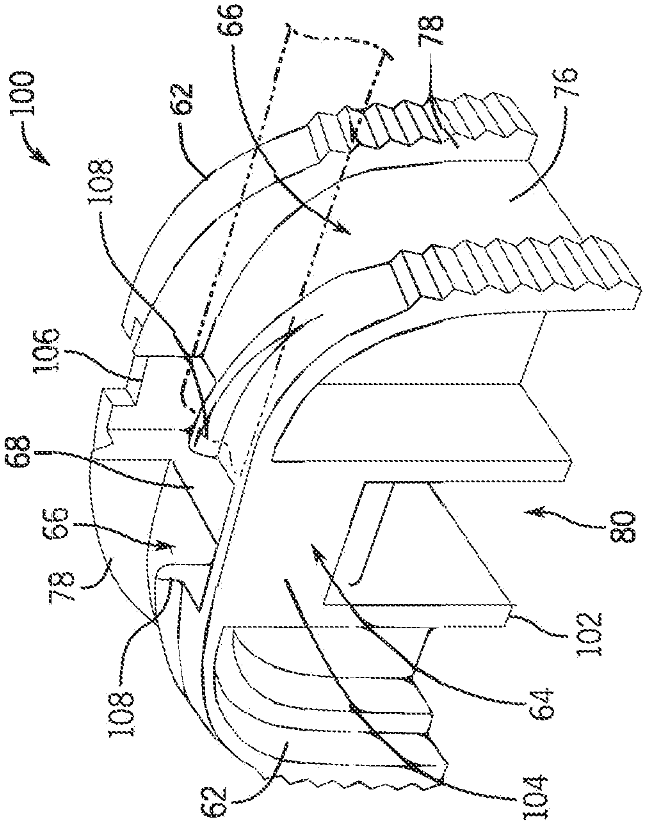
FIG. 10 is a perspective view of a jig according to some embodiments.

FIG. 10 illustrates another jig 100 according to some embodiments. While FIGS. 5-9 illustrate hand-held jigs 60, 90 (that is, the jigs 60, 90 are held during termination), the jig 100 of FIG. 10 may include a flat bottom surface 102 to, for example, help stabilize the jig 100 against a surface such as a tabletop during termination. More specifically, the jig 100 can include two elongated, curved sides 62 separated by a central piece 64. The jig 100 can include a cable track 66 along both sides 62 and a connector retaining segment 68, formed by the central piece 64 and upper ends 70 of the sides 62, and including a receiving well 72. The sides 62 and the central piece 64 can each extend downward to form the flat bottom surface 102. However, the jig 100 can still define an open space 80 below the central piece 64 to accommodate a clamping tool for installation.

Furthermore, in some embodiments, as shown in FIG. 10, the central piece 64 can include front and back walls 104, 106 that extend between the sides 62, further defining the connector retaining segment 68. At least one of the walls 104 or 106 can extend a height substantially flush with an upper surface of an assembled connector 30-38 properly placed in the connector retaining segment 68. As a result, the front wall 104 and/or the back wall 106 can serve as tool compression stop surfaces, indicating to an installer when the connector 30-38 has been compressed to an assembled state (i.e., when the tool contacts the wall 104, 106). Thus, to assemble a connector 30-38, a user can pinch the ribbon cable 18 against one or both tracks 66 (e.g., from above the jig 100 while the jig 100 rests on a surface) to hold the cable 18 in place and ensure proper alignment of the cable 18 with the connector 30-38, and also to set a specific crimping location of the connector 30-38 along the ribbon cable 18. Then, the user can engage the upper and lower surfaces of the connector 30-38 or, in some embodiments, a lower surface of the central piece 64 with a clamping tool (not shown). The tool can then press the cover 42 and the housing 40 together until the tool reaches one of the walls 104, 106 to cause the connector 30-38 to properly crimp onto the ribbon cable 18.

As described above, the space 80 defined between lower ends 74 of the sides 62 and a lower surface of the central piece 64 can serve as a guide for proper tool alignment with the connector 32. That is, the space 80 can receive lower jaws of a tool so that the tool can apply sufficient compressive forces against the housing 40 and the cover 42. Furthermore, in some embodiments, as shown in FIG. 10, the retaining walls 78 of the cable tracks 66 can extend further upward, forming protrusions 108 along either end of the connector retaining segment 68 to serve as an upper guide for proper tool alignment with the connector 32. Accordingly, a tool can be properly aligned between the protrusions

108 above the connector 32 and within the space 80 below the connector 32 prior to clamping.

FIGS. 11-19 illustrate jigs of various embodiments, including one or more cable retention features. That is, while the jigs 60, 90, 100 of FIGS. 5-10 described above generally call for a user to pinch the ribbon cable 18 against the cable tracks 66 during install, the jigs of FIGS. 11-19 include cable retention features configured to retain a cable within a cable track 66 during install.

Figure 11:
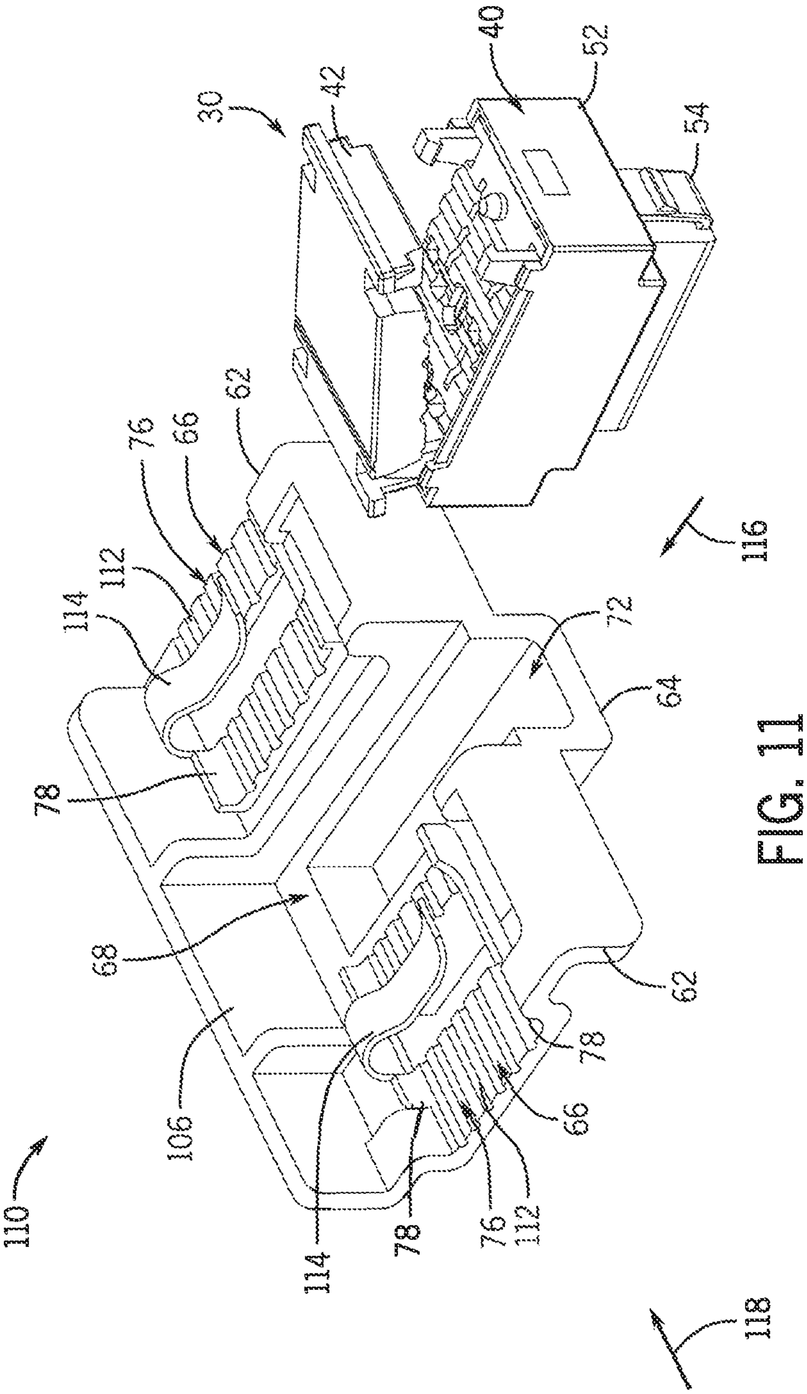
FIG. 11 is a perspective view of a jig, according to some embodiments, and a node connector.

For example. FIG. 11 illustrates a jig 110 according to some embodiments. The jig 110 can include two elongated sides 62 separated by a central piece 64. The jig 100 can include a cable track 66 along both sides 62 and a connector retaining segment 68, formed by the central piece 64 and the sides 62, and including a receiving well 72. As shown in FIG. 11, the cable tracks 66 can extend substantially parallel to the central piece 64 (e.g., as opposed to the cable tracks 66 of FIGS. 5-8 extending substantially perpendicular to the central piece 64). Furthermore, the flat sections 76 of the cable tracks 66 can include an inverse ribbon profile 112 that generally mirrors a ribbon profile 28 of a ribbon cable 18 (as shown in FIG. 1A), thus allowing the ribbon cable 18 to rest upon the inverse ribbon profile 112 when properly aligned.

In some embodiments, the cable tracks 66 can each also include a cable retaining clip 114 extending from one of the retaining walls 78, acting as a cable retaining feature, for example, to urge the ribbon cable 18 toward the cable track 66. The cable retaining clip 114 can be sized and configured to retain a ribbon cable 18 within the cable track 66. Furthermore, in some embodiments, the cable retaining clip 114 can retain the ribbon cable 18 while still permitting lateral sliding of the ribbon cable 18 across the cable track 66. Additionally, in some embodiments, the cable tracks 66 can be substantially flexible so that they can flex (e.g., depress downward) during clamping to accommodate vertical movement of a ribbon cable 18 within the connector 30-38 during installation.

Accordingly, as shown in FIG. 11, a pre-assembled connector 32 can be placed within the connector retaining segment 68. For example, the connector 32 can be slid into the connector retaining segment 68 until the connector 32 contacts a back wall 106 of the jig 110. Additionally, a ribbon cable 18 can be positioned to fit within or be aligned with the cable tracks 66 on one or both sides 62, and extend across the open top of the connector 32. For example, the ribbon cable 18 can be slid in a first direction (indicated by arrows 116) into the connector 32 and both cable tracks 66 simultaneously until the ribbon profile 28 of the ribbon cable 18 aligns with the inverse profile 112 of the cable tracks 66. Alternatively, the ribbon cable 18 can be slid in a second direction (indicated by arrows 118) across a first cable track 66 (e.g., under the first cable retaining clip 114), across the housing 40, and then across the second cable track 66 (e.g., under the second cable retaining clip 114) until a desired location of the ribbon cable 18 is located across the open top 44 of the housing 40 (e.g., to set a specific crimping location of the connector 32 along the ribbon cable 18). Then, the user can engage the upper surface of the connector 32 and the lower surface of the central piece 64 with a clamping tool (not shown). The tool can then press the cover 42 and the housing 40 together to cause the connector 32 to crimp onto the ribbon cable 18. As the connector 32 is crimped onto the ribbon cable 18, causing the ribbon cable 18 to travel vertically downward within the housing 40 and, in turn, causing the cable tracks 66 to flex downward with the ribbon cable 18.

Figure 12:
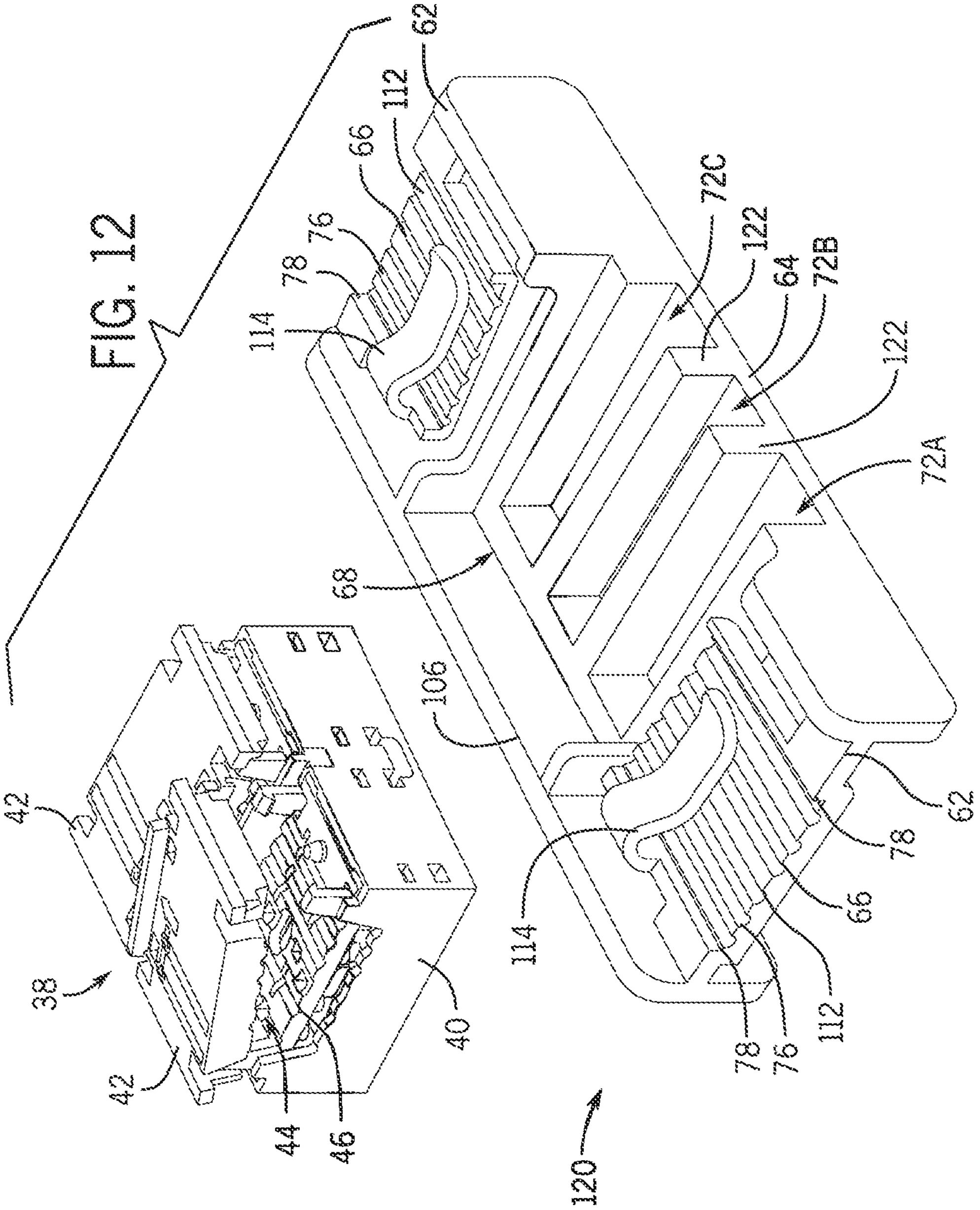
FIG. 12 is a perspective view of another embodiment of the jig of FIG. 11.

FIG. 12 illustrates another jig 120 according to some embodiments. The jig 120 of FIG. 12 may be substantially similar to the jig 110 of FIG. 11 but can include a universal connector retaining segment 68 configured to receive any type of connector 30-38. More specifically, as shown in FIG. 12, the connector retaining segment 68 can include multiple receiving wells 72*a*-72*c*, separated by well walls 122, each configured to receive a particular connector 30-34. That is, the connector retaining segment 68 can include a first receiving well 72*a* sized to receive a power tap right connector 34, a second receiving well 72*b* sized to receive a node connector 32, and a third receiving well 72*c* sized to receive a power tap left connector 30. A terminator 36 may be positioned adjacent the first receiving well 72*a* or the third receiving well 72*c,* for example, based on which side a ribbon cable 18 is configured to enter the terminator 36. And a splicer may be positioned to extend across the entire connector retaining segment 68 (or a portion thereof). In this manner, the cable tracks 66 and respective cable retaining clips 114 can better serve to align a ribbon cable 18 with a specific connector 30-38. More specifically, a power tap right connector 34 only needs a cable track 66 and a cable retaining clip 114 along a left side thereof, while a power tap left connector 30 only needs a cable track 66 and a cable retaining clip 114 along a right side thereof.

Figure 13:
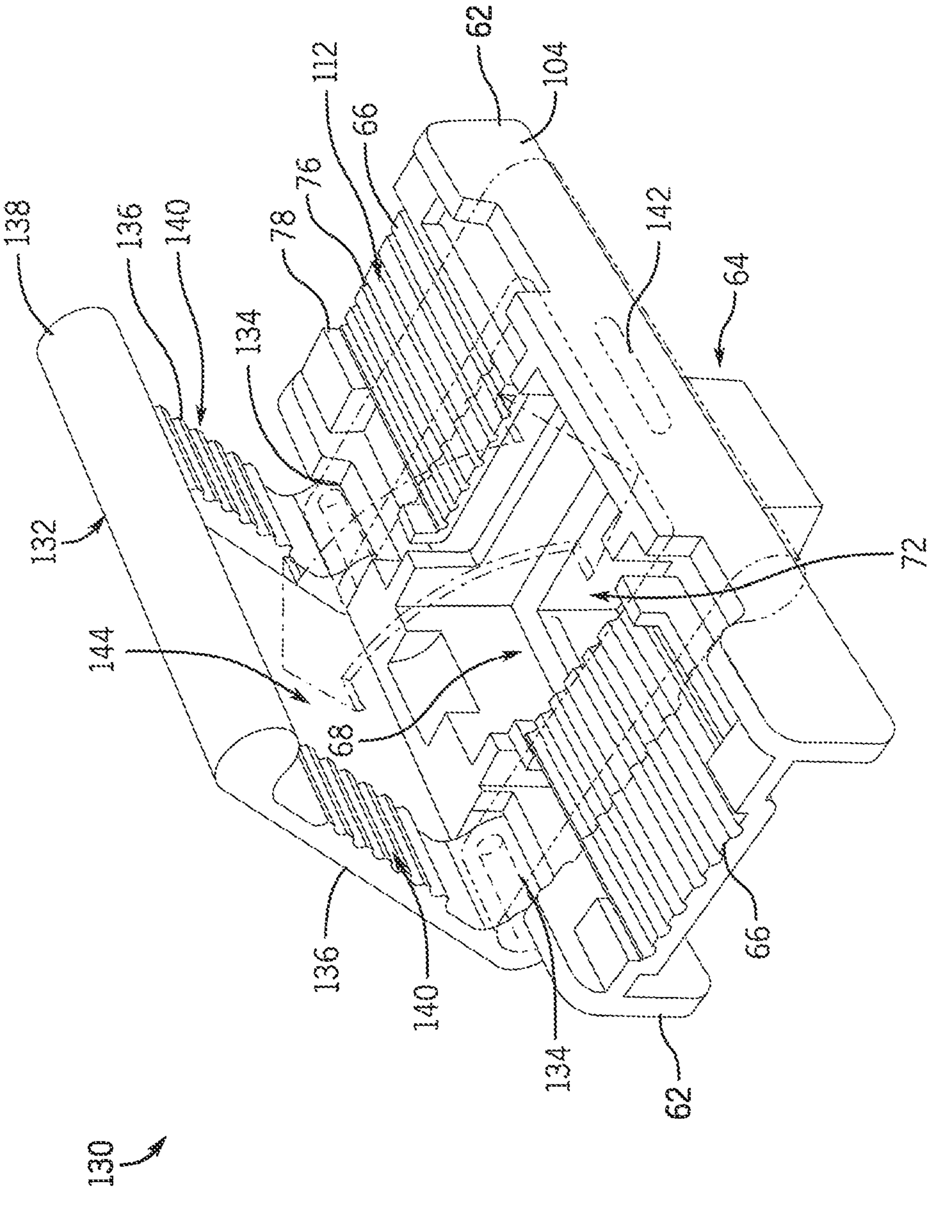
FIG. 13 is a perspective view of another embodiment of the jig of FIG. 11.

FIG. 13 illustrates another jig 130 according to some embodiments. The jig 130 of FIG. 13 may be substantially similar to the jigs 110, 120 of FIGS. 11-12 but, rather than the cable retaining clips 114 acting as the cable retaining feature, the jig 130 can include a hinged cover 132. For example, the cover 132 can be a U-shaped cover configured to pivot about the back wall 106 (e.g., at hinges 134). The cover 132 can be pivoted to an open position to permit cable insertion onto the cable tracks 66, and to a closed position to permit cable retention against the cable tracks 66.

The U-shaped cover 132 can include two extensions 136, configured to extend across the cable tracks 66 from the hinges 134 to hold down a ribbon cable 18, and connected by a connector piece 138. In some embodiments, the extensions 136 can each include inverse ribbon profiles 140. As a result, as the cover 132 is closed onto a ribbon cable 18 seated on the cable tracks 66, the inverse ribbon profiles 112, 140 of the cable tracks 66 and the extensions 136 can help urge the ribbon cable 18 into proper alignment against the cable tracks 66.

The extensions 136 can extend outward far enough so that the connector piece 138 can engage a front wall 104 of the jig 130 when in a closed position. In some embodiments, the connector piece 138 can include a protrusion 142 configured to snap into a detent (not shown) in the front wall 104 when the cover 132 is in the closed position. Furthermore, due to the size and configuration of the cover 132, the extensions 136 and the connector piece 138 can define a connector space 144 therebetween. The connector space 144 may be large enough to accommodate movement of a connector 30-38 therethrough. As a result, a connector 30-38 may be inserted into the connector retaining segment 68 when the cover 132 is in the open position or the closed position.

Figure 14:
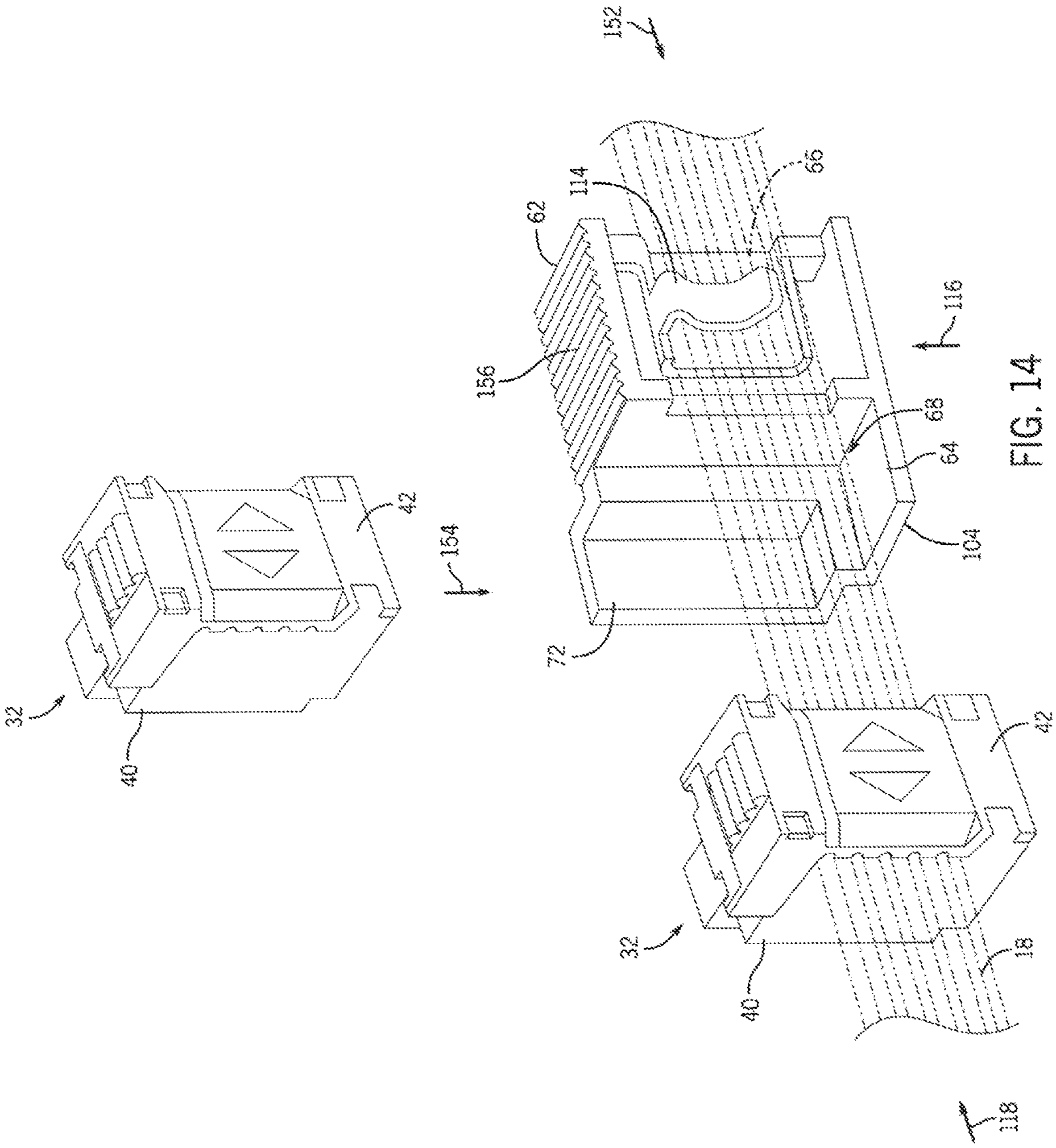
FIG. 14 is a perspective view of a jig, according to some embodiments, and a node connector.

FIG. 14 illustrates another jig 150 according to some embodiments. The jig 150 can be similar to the jig 110 of FIG. 11 but, rather than including a side portion with two sides 62, the jig 150 may only include a single side 62 extending from a central piece 64. As a result, a connector retaining segment 68 can be defined by the central piece 64 and the side 62, and a connector 32 can slide into the connector retaining segment 68 until it reaches the side 62.

Similar to the jigs 110, 120 of FIGS. 11 and 12, the cable track 66 along the side 62 can include a cable retaining clip 114.

Thus, a pre-assembled connector 32 can be placed within the connector retaining segment 68. For example, the connector 32 can be slid into the connector retaining segment 68 toward the side 62 (e.g., in the direction of arrow 118) until the connector 32 reaches the side 62. Additionally, a ribbon cable 18 can be positioned to fit within or be aligned with the cable track 66 on the side 62, and extend across the open top 44 of the connector 32. For example, the ribbon cable 18 can be slid in a first direction (indicated by arrow 116) into the connector 32 and the cable track 66 simultaneously until the ribbon cable 18 reaches the retaining wall 78 adjacent the cable retaining clip 114. Alternatively, the ribbon cable 18 can be slid in a second direction across the connector, then across the cable track 66 (indicated by arrow 118), or first across the cable track 66, then across the connector 32 (indicated by arrow 152), until a desired location of the ribbon cable 18 is located across the open top 44 of the housing 40 (e.g., to set a specific crimping location of the connector 32 along the ribbon cable 18). Then, the user can engage the upper surface of the connector 32 and the lower surface of the central piece 64 with a clamping tool (not shown). The tool can then press the cover 42 and the housing 40 together to cause the connector 32 to crimp onto the ribbon cable 18.

In some embodiments, once the ribbon cable 18 is installed on the connector 32, the connector 32 and the ribbon cable 18 can be slid away from the jig 150 in the direction of arrow 152 so that the ribbon cable 18 remains against the cable track 66 by the cable retaining clip 114, as shown in FIG. 14. Once the connector 32 is slid out of the connector retaining segment 68, a new connector 30-38 may be inserted into the connector retaining segment 68 (e.g., slid over the ribbon cable 18 in the direction of arrow 154) for installation. In some embodiments, as shown in FIG. 14, an outer surface of the front and/or back walls 104, 106 can be a textured surface 156 (e.g., with grooves), for example, to help a user grip the jig 150 while sliding a ribbon cable 18 along the cable track 66.

Figure 15:
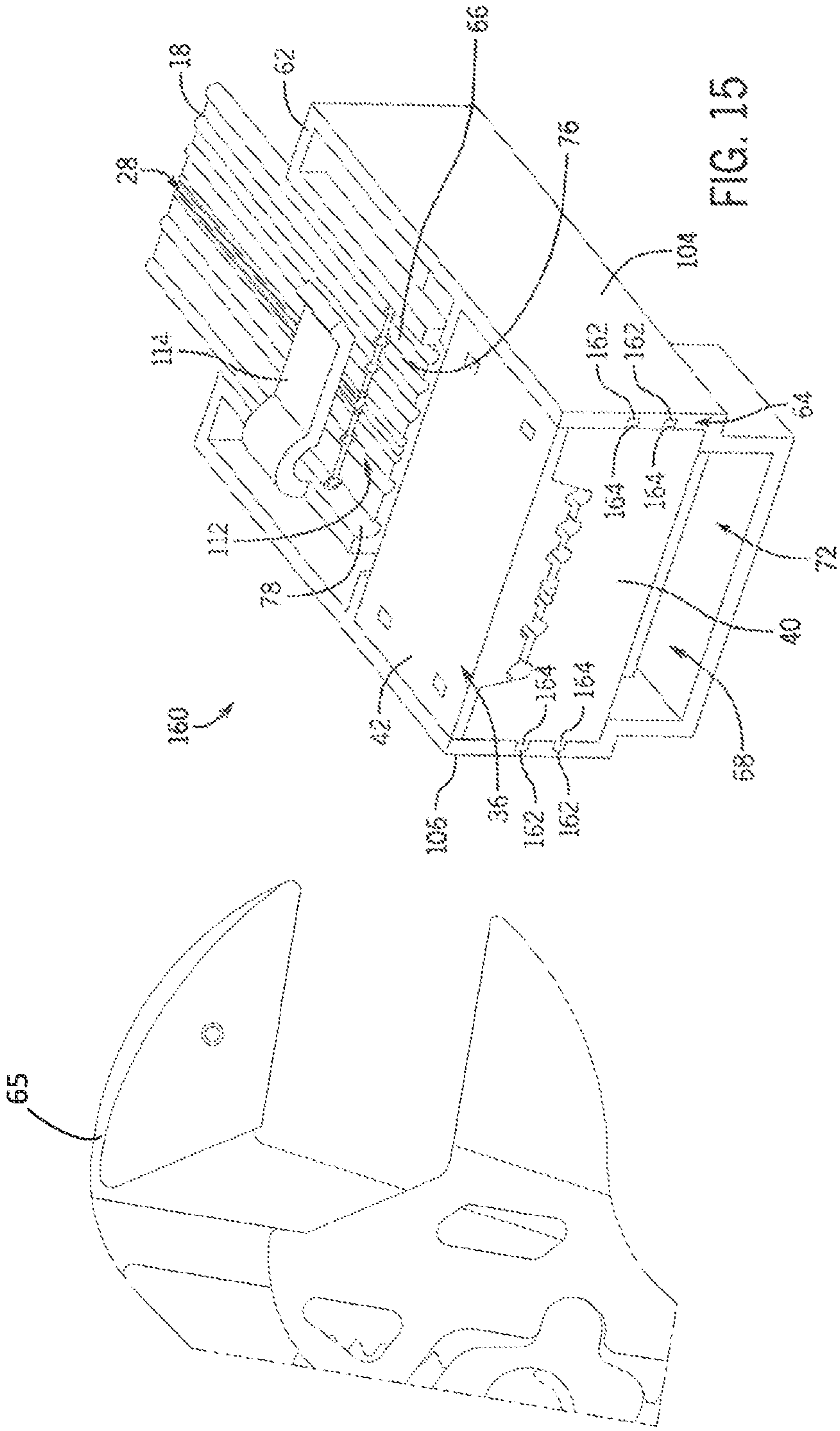
FIG. 15 is a perspective view of a jig, according to some embodiments, and a power tap left connector.

FIG. 15 illustrates another jig 160 according to some embodiments. The jig 160 can be substantially similar to the jig 150 of FIG. 14; however, the jig 160 can include one or more connector guidance features. More specifically, as shown in FIG. 15, the front and/or back walls 104, 106 of the central piece 64 can include one or more internal guide tracks 162. The guide tracks 162 can be sized to receive mating guide ribs 164 on a connector housing 40. Thus, a pre-assembled connector 32 can be slid into the connector retaining segment 68 so that the guide ribs 164 slide through the guide tracks 162 until finally reaching the side 62. The guide tracks 162 can therefore ensure proper vertical orientation of the connector 32 within the connector retaining segment 68, which can ensure proper compressive forces applied to the connector 32 during termination. That is, if a connector 32 is placed higher up in the connector retaining segment 68 and a user clamps down on the connector 32 until the clamping tool reaches the walls 104, 106, the user might "over-clamp" or use excessive force during termination. Additionally, in some embodiments, the guide ribs 164 on the housing 40 can also provide texture to act as a finger gripping surface for a user.

Figure 16:
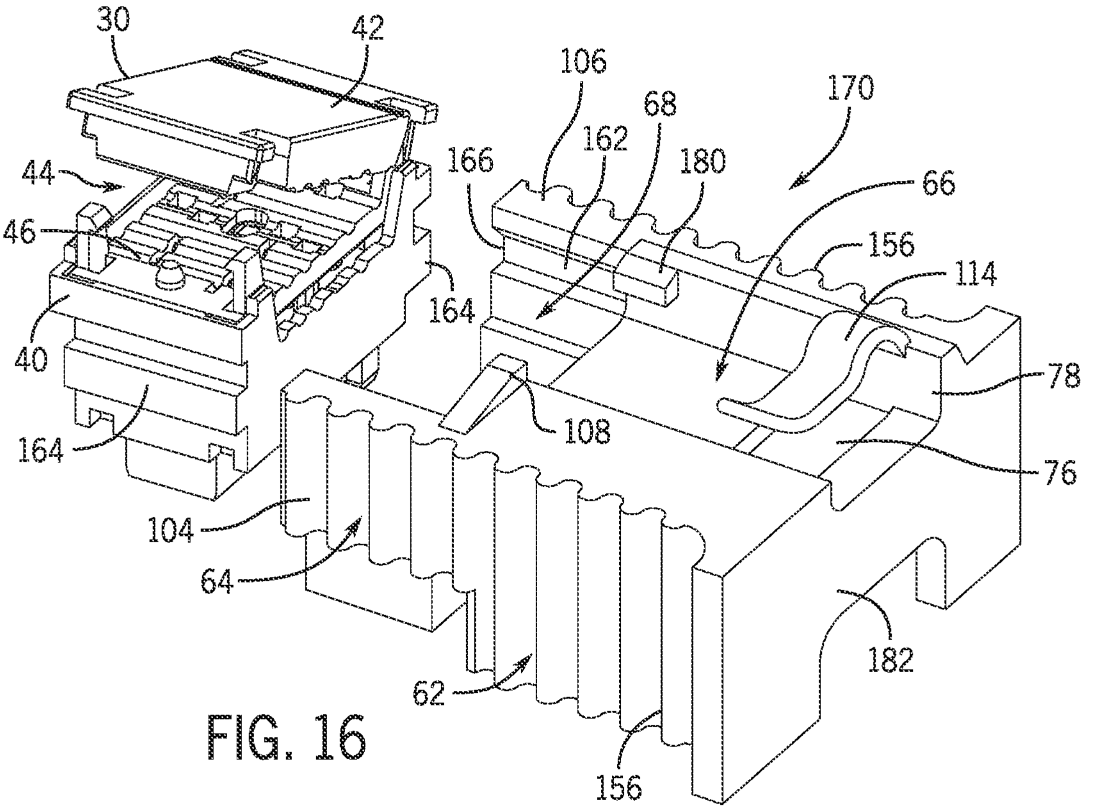
FIG. 16 is perspective view of a jig, according to some embodiments, and a power tap left connector.
Figure 17:
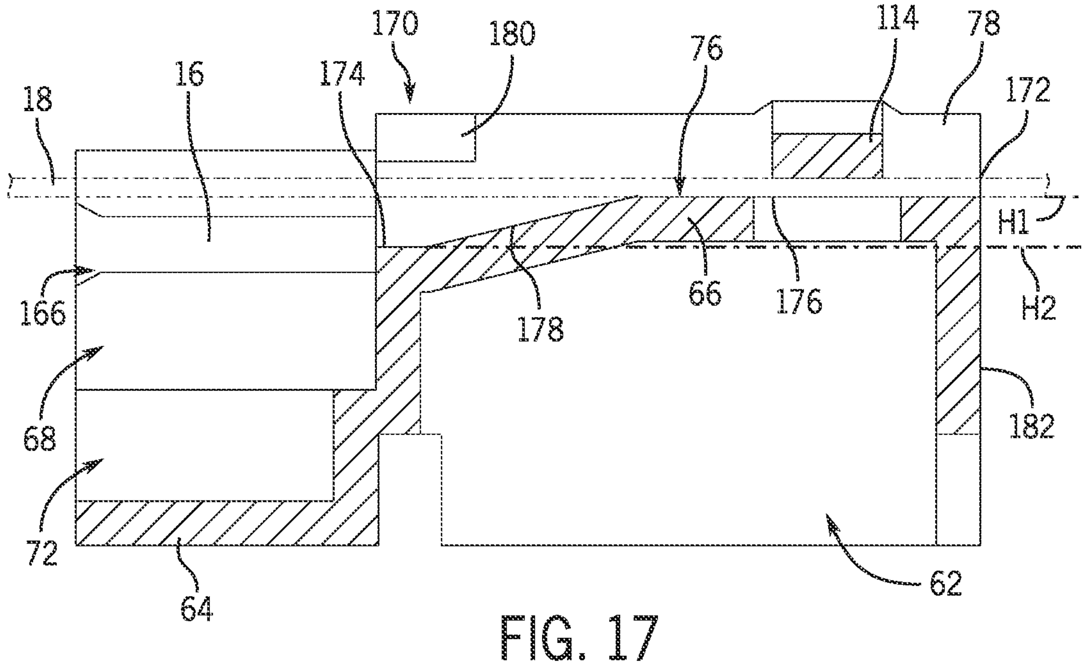
FIG. 17 is a cross-sectional view of the jig of FIG. 16.

FIGS. 16 and 17 illustrates another jig 170 according to some embodiments. The jig 170 can be substantially similar to the jig 160 of FIG. 15. For example, jig 170 can include a single side 62 with a cable track 66 and an adjacent central piece 64. The jig 170 can also include one or more guide tracks 162 configured to receive guide ribs 164 of as associated housing 40. In some embodiments, as shown in FIG. 17, the guide track 162 can include a tapered entrance 166 to promote easier alignment with a connector 32 as the connector 32 is installed in the connector retaining segment 68. The jig 160 can also include a protrusion 108 to promote clamping tool orientation, as described above.

Additionally, in some embodiments, as shown in FIGS. 16 and 17, the jig 170 can include one or more additional cable retention features. More specifically, the jig 170 can include the cable retaining clip 114, like the jig 160 of FIG. 15, as well as a cable retaining tab 180. The cable retaining tab 180 may be positioned adjacent the proximal end 174, and not extend as far across the cable track 66 as the cable retaining clip 114, but can act to retain a ribbon cable 18 within the cable track 66.

Unlike the jig 160 of FIG. 15, which may include a flat cable track 66, the jig 170 of FIGS. 16-17 can include a ramped cable track 66 providing clearance for cable termination travel. More specifically, as discussed above, in some embodiments, the cable track 66 can be substantially flat but flexible to flex in response to vertical movement of a ribbon cable 18 into the housing 40 during termination. As shown in FIG. 17, the cable track 66 along the side 62 can start at a first height H1, at a distal end 172 from the central piece 64, and ramp down to a second, lower height H2 at a proximal end 174 to the central piece 64. The cable track 66 (e.g., the flat section 76) can include a smooth, consistent ramp-down from the distal end 172 to the proximal end 174 in some embodiments, or can include flat portions 176 and ramped portions 178 between the two ends 172, 174, as shown in FIG. 17.

Generally, the first height H1 can be a resting height of the ribbon cable 18 when the connector 30 is in the preassembled condition. Thus, as shown in FIG. 17, in the preassembled state, the ribbon cable 18 can extend across the cable track 66, only contacting the flat section 76 of the cable track near the distal end 172. The second height H2 can be a terminated height of the ribbon cable 18, that is, when the ribbon cable 18 is installed on an assembled connector 32. Thus, in the assembled state, the ribbon cable 18 can extend across the cable track 66, contacting the cable track 66 near the proximal end 174 and traveling along the cable track 66, ramping up to the distal end 172. In some embodiments, if an assembled connector 32 is jammed within the connector retaining segment 68, a tool (such as a screwdriver) can be pressed upward from an underside of the central piece 64 (e.g., through a hole (not shown) in the central piece 64) to urge the connector 32 out of the connector retaining segment 68.

In some embodiments, the jig 170 can also assist with properly aligning a ribbon cable 18 when the ribbon cable 18 must be cut. For example, as shown in FIG. 16, the distal end 172 of the side 62 can include a flat outer wall 182 that can serve as a straight cutting aid for a cutting tool. Thus, a user can align the ribbon cable 18 in the cable track 66, and cut the ribbon cable 18 by aligning a cutting tool with the outer wall 182.

Figure 18:
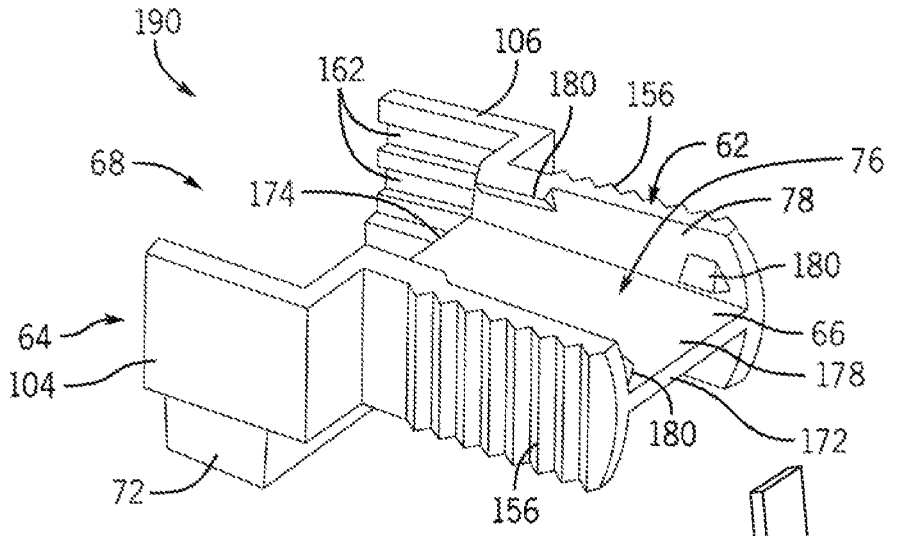
FIG. 18 is a perspective view of a jig according to some embodiments.

FIG. 18 illustrates another jig 190 according to some embodiments. The jig 190 can include multiple retaining tabs 180, without a cable retaining clip 114. Also, the flat section 76 may include a flat surface without a ribbon profile. As a result, the jig 190 can be reversible, for example, to receive a power tap left connector 30 with the side 62 extending from a right side thereof, or flipped to receive a power tap right connector 34 with the side 62 extending from a left side thereof. Additionally, in some embodiments, the jig 190 can include a ramped cable track 66. However, unlike the ramped cable track 66 of FIGS. 17-18, the cable track 66 of FIG. 19 can ramp downward from a proximal end 174 to a distal end 172. That is, the proximal end 174 can be a height H1, while the distal end 172 can be at height H2.

Figure 19:
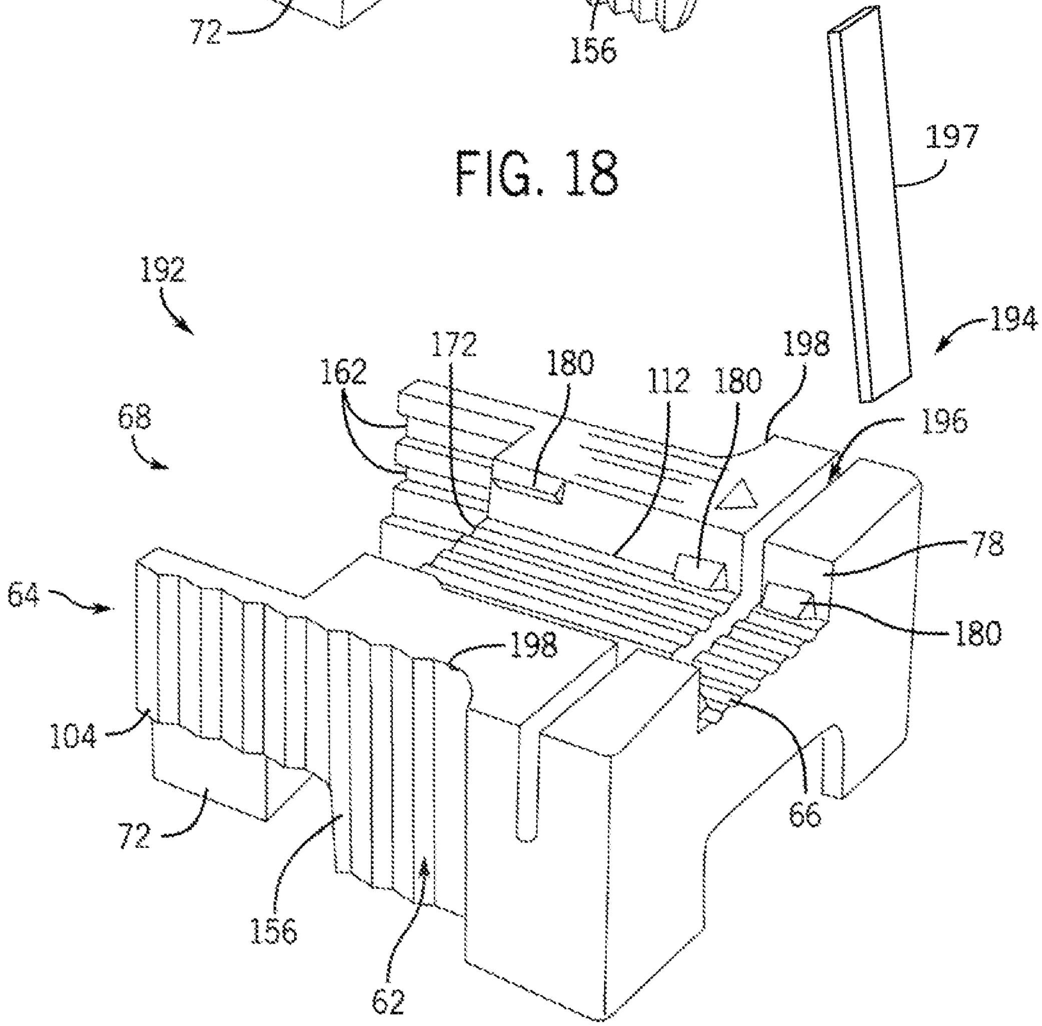
FIG. 19 is a perspective view of a jig according to some embodiments.

FIG. 19 illustrates another jig 192 according to some embodiments. The jig 192 can incorporate features of the jig 190 of FIG. 18, such as the central piece 64, single side 62, and cable retaining tabs 180 along the cable track 66. Additionally, the jig 192 can include a cutting guide section 194. For example, the cutting guide section 194 can include an indent 196 extending partially through the side 62, across the cable track 66, and configured to receive a cutting tool 197. The cutting guide section 194 can also include flanges 198 to help protect a user's fingers during cutting. Accordingly, a user can align a ribbon cable 18 in the cable track 66, grip the jig 192 adjacent the flanges 198, and cut the ribbon cable 18 by pressing the cutting tool 197 into the indent 196.

In light of the above, embodiments provide various one-piece, reusable jigs to assist with cable termination. A flat ribbon-style cable can be introduced into a connector retaining segment of the jig, where the edges and one face are located and aligned onto the connector retaining segment, while the opposite cable face can be pushed down by a cable retaining feature, squeezing and biasing the ribbon cable. Thus, the ribbon cable is temporarily held and clamped into position, but with a degree of freedom to allow the jig to translate or "slide" along the cable length. As a connector is introduced into a connector retaining segment of the jig, the connector housing can be pushed into the connector retaining segment, whose wall(s) surround and envelope the connector housing (e.g., on two, three, four, or five sides). Along one side, a clamping surface may be provided to prevent connector electrical receptacle contacts along a bottom surface of the connector from being directly clamped on with a crimping load. The housing and cover of the connector may be the connector parts having the most structural rigidity and, combined with rigid portions of the jig, can act as the primary load bearing structures when the cover and jig are squeezed together with a clamping tool.

Accordingly, the above-described jigs can improve cable alignment, be easy to hold, be intuitive, and integrate easily into the workflow with a net benefit to the user. These jigs may not only serve to grip a ribbon cable, but also can present a cable segment at an appropriate position, allowing translation and termination into a respective connector, while an adjacent cable segment remains fixed to the jig for stable positioning. The jigs above may each be made of a single, low-cost, molded part and, as a result: can be provided in a standard package of connectors and/or ribbon cable; can be reusable with appropriate durability, though disposed after repeated wear and tear; and can be replaced at low-cost once its useful life is consumed.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method of installing a ribbon cable on a connector, the method comprising:

placing the connector within a connector retaining segment of a jig, the jig comprising a space defined between lower ends of the jig configured to accommodate a lower jaw of a tool; positioning the ribbon cable within a cable track of the jig;

aligning the ribbon cable across an open top of the connector, the open top formed between a cover of the connector and a housing of the connector; and applying compressive forces against an upper surface of the cover of the connector using an upper jaw of the tool and a lower surface of the jig using the lower jaw of the tool within the space to urge the cover toward the housing to entrap the ribbon cable within the housing.

2. The method of claim 1, wherein the connector retaining segment of the jig is at least partially defined by a central piece and a side portion coupled to the central piece, and wherein applying the compressive forces includes using the tool to apply the compressive forces against the upper surface of the connector until the tool engages a wall of the central piece.

3. The method of claim 1 and further comprising retaining the ribbon cable within the cable track via one of a cable retaining clip, a cable retaining tab, or a cover that extends over the cable track.

4. The method of claim 1 and further comprising sliding the connector out of the connector retaining segment while the ribbon cable remains in the cable track; and placing a second connector within the connector retaining segment over the ribbon cable.

5. The method of claim 1 and further comprising cutting an end of the ribbon cable after positioning the ribbon cable within the cable track.

6. The method of claim 5, wherein cutting the end of the ribbon cable includes inserting a cutting tool into an indent in the cable track while the ribbon cable is positioned within the cable track.

7. The method of claim 5, wherein cutting the end of the ribbon cable includes aligning a cutting tool with a flat outer wall of the jig.

8. The method of claim 1 and further comprising cutting an end of the ribbon cable by inserting a cutting tool into an indent in the cable track while the ribbon cable is positioned within the cable track.

9. The method of claim 1, wherein positioning the ribbon cable within the cable track includes aligning the ribbon cable across the cable track in a first direction;

and aligning the ribbon cable across the open top of the connector includes aligning the ribbon cable in a second direction perpendicular to the first direction.

10. The method of claim 1, wherein positioning the ribbon cable within the cable track includes aligning the ribbon cable across the cable track in a first direction;

and aligning the ribbon cable across the open top of the connector includes aligning the ribbon cable in a second direction parallel to the first direction.

11. The method of claim 1, wherein placing the connector within the connector retaining segment includes fitting the connector into the connector retaining segment via a snap-fit engagement.

12. The method of claim 1, wherein placing the connector within the connector retaining segment includes sliding guide ribs on the connector into guide tracks within the connector retaining segment.

13. The method of claim 1, wherein placing the connector within the connector retaining segment includes:

pressing together lower ends of a first side of the jig and a second side of the jig to expand upper ends of the first side of the jig and the second side of the jig;

inserting the connector within the connector retaining segment, which is at least partially defined between the upper ends of the first side of the jig and the second side of the jig; and releasing the lower ends of the first side of the jig and the second side of the jig to cause the upper ends of the first side of the jig and the second side of the jig to compress against the connector.

14. The method of claim 1, wherein placing the connector within the connector retaining segment includes pressing the connector into the jig until a protrusion of the connector snaps into a detent of the jig.

15. The method of claim 1, wherein positioning the ribbon cable within the cable track includes pinching the ribbon cable against the cable track on a first side of the jig and a second side of the jig.

16. The method of claim 1, wherein aligning the ribbon cable across the open top of the connector includes aligning the ribbon cable at a first height even with a distal end of the cable track; and applying the compressive forces causes the ribbon cable to exit the connector at a second height even with a proximal end of the cable track, wherein the cable track is ramped from the proximal end to the distal end.

17. The method of claim 1, wherein the connector retaining segment of the jig is at least partially defined between a first side of the jig, a second side of the jig, and a first wall of the jig; and wherein applying the compressive forces includes using the tool to apply the compressive forces against the upper surface of the cover of the connector until the tool engages the first wall.

18. The method of claim 1, wherein positioning the ribbon cable within the cable track of the jig is performed before placing the connector within the connector retaining segment of the jig.

19. The method of claim 1, wherein the connector retaining segment is configured to permit placing the connector within the connector retaining segment from:

above the jig so that the connector is moved downward onto the connector retaining segment;

in front of the jig so that the connector is moved rearward, perpendicular to a length of the cable track, onto the connector retaining segment; or beside the jig so that the connector is moved sideways, parallel to a length of the cable track, onto the connector retaining segment.

20. The method of claim 1, wherein applying the compressive forces includes using a pliers as the tool to apply the compressive forces against the upper surface of the connector and the lower surface of the jig.

* * * * *